United States Patent [19]

Mandt

[11] 4,372,851
[45] * Feb. 8, 1983

[54] MULTI STAGE FLOCCULATION TREATMENT SYSTEM

[75] Inventor: Mikkel G. Mandt, Cedar Falls, Iowa

[73] Assignee: Clevepak Corporation, White Plains, N.Y.

[*] Notice: The portion of the term of this patent subsequent to Apr. 26, 1994, has been disclaimed.

[21] Appl. No.: 286,712

[22] Filed: Jul. 24, 1981

Related U.S. Application Data

[60] Continuation of Ser. No. 109,136, Feb. 2, 1980, abandoned, which is a division of Ser. No. 868,801, Jan. 12, 1978, Pat. No. 4,206,052.

[51] Int. Cl.³ .............................................. C02F 1/52
[52] U.S. Cl. ..................................... 210/199; 210/220
[58] Field of Search ............... 210/199, 205, 208, 219, 210/220

[56] References Cited

U.S. PATENT DOCUMENTS

| | | | |
|---|---|---|---|
| 3,460,678 | 8/1969 | Condolios | 210/219 |
| 4,019,983 | 4/1977 | Mandt | 210/220 X |
| 4,139,579 | 2/1979 | Blum | 210/219 X |
| 4,162,970 | 7/1979 | Zlokarnik | 210/220 X |
| 4,206,052 | 6/1980 | Mandt | 210/220 X |

*Primary Examiner*—Thomas G. Wyse

[57] ABSTRACT

Systems for flocculation processing in water purification treatment in which a first jet flash mixing field of relatively high specific energy requirement and turbulence intensity is provided for intimate mixture of the flocculant and influent water to produce a thoroughly mixed product stream having residual energy, and in which the product stream from the first mixing field is used as the motive stream to power a flocculation field of lower specific energy requirement and turbulence intensity.

4 Claims, 3 Drawing Figures

MULTI STAGE FLOCCULATION TREATMENT SYSTEM

This is a continuation of Ser. No. 109,136, filed Jan. 2, 1980, abandoned, which is a division of Ser. No. 868,801, filed Jan. 12, 1978, now U.S. Pat. No. 4,206,052.

The present invention is directed to methods and apparatus for water treatment, and more particularly, is directed to methods and apparatus for flocculation processing in water purification treatment, such as the treatment and purification of wastewater.

Chemical coagulation and flocculation processing is conventionally utilized to facilitate, by formation of a precipitate, the separation of suspended and colloidal matter through sedimentation and/or filtration in wastewater. In coagulation and flocculation treatment, a chemical coagulant, such as aluminum sulfate, ferric chloride, ferric sulfate, and/or ferrous sulfate, in conjunction with pH control, is thoroughly mixed with the water to be treated. Thorough mixing of the coagulant chemical with the treated water is desirable to obtain economy of chemical dosage, but relatively gentle mixing is generally necessary in order to obtain a resultant floc, or coagulum, that is large enough to settle or filter. After the floc is formed, provision may conventionally be made for a quiescent period during which the floc can settle and carry down or agglomerate with it the suspended and colloidal material in the water being treated.

Coagulation processes employed in water treatment may conventionally utilize two distinct stages having different operating criteria. In this connection, an initial mixing stage such as a continuously stirred tank mixer may be used to provide intimate mixing of the influent treatment water with the chemical coagulant. The resulting mixture may be then conducted to a flocculation stage for floc development. A relatively high turbulence intensity coupled with a high specific energy requirement may be used to rapidly disperse the coagulant and pH control reagents in an influent, raw water stream in the initial mixing stage. A relatively low turbulence intensity employed over a longer period of time may be used in the second, flocculation stage to promote aggregation of the colloidal particulate material present in the raw water. The methods and apparatus conventionally employed to accomplish each stage vary widely. In general, however, the recommended specific energy requirements, residence time, and turbulence intensity tend to be similar for various of the methods, such as a specific energy requirement for mechanical mixing energy input to the initial mixing stage of about 0.26 hp/MGD with a residence time of about 30 seconds and a turbulence intensity greater than 50%, and a specific energy requirement of about 0.09 hp/MGD for the flocculation stage with a residence time of about 30 minutes and a turbulence intensity of less than 5%. The turbulence intensity is a ratio of the specific turbulent energy dissipation ratio to the specific total energy dissipation rate.

The overall performance of a coagulation process may be evaluated in terms of the fraction of the light scattering colloidal material (turbidity) entering in the raw water which is rendered settleable or removable in the product stream leaving the flocculation process. The system performance may be measured as the ratio of the turbidity remaining in the supernatant of a settled, or treated, effluent sample from the flocculation process, relative to the turbidity in the raw, influent water stream. Research directed at improving performance of the coagulation process has been conducted at the University of California at Berkeley. The following table summarizes the phenomenal description of the coagulation process which has resulted from these studies:

TABLE 1

| | MODEL COAGULATION PROCESS PHENOMENA | | |
|---|---|---|---|
| | RECOMMENDED SPECIFIC | Phenomenal Stage | |
| PROCESS STAGE | ENERGY DISSIPATION RATES, hp/1000 ft$^3$ | Batch Time Sec | Description |
| Initial Mixing | 6, with high turbulence intensity | 0$^+$ | Coagulant Introduction with Instantaneous Hydrolysis: $Al^{+3} + 3 H_2O \rightarrow Al(OH)_3 + 3 H^+$ |
| | | 1 | Reduced Inhomogeniety, Primary Alum Floc Particle Volume = $V_o$ |
| Flocculation | 0.04, with low turbulence intensity | 100 | Settleable Alum-Clay Floc Particle Volume Produced = $V_s$ |
| | | 1000 | Equilibrium Flocculation: Floc Aggregation = Floc Breakup Alum-Clay Floc Particle Volume = $\hat{v}$ |

As shown in the table, the optimal end result of an initial mixing stage is a homogeneous mixture of the alum coagulant throughout the raw water stream, and, as a result of self-aggregation of the alum hydrolysis products, primary alum floc particles of average volume $v_o$. In optimal flocculation processes, the primary alum floc particles are aggregated together with the light scattering colloidal and/or suspensoid particles (i.e., clay) responsible for the turbidity (enmeshment mechanism of flocculation). Normally, on a batch basis, such alum-clay floc aggregates grow to a settleable floc volume $v_s$ within a few minutes.

The flocculation process may be considered to continue until equilibrium flocculation is reached, in which floc aggregation is balanced with floc breakup due to the turbulent eddy forces present in the flocculation process. At this point, the average floc volume has approached the maximum obtainable floc volume, $\hat{v}$.

However, conventional systems for flocculation treatment, such as continuously stirred tank reactor systems, tend to have various disadvantages including undesirably high energy consumption and mechanical cost or complexity so that systems with improved energy efficiency and other attributes would be desirable.

As described in U.S. Pat. No. 4,019,983, methods and apparatus utilizing a motive jet stream have been developed for wastewater disinfection processes, and have particularly effective operating parameters. Such apparatus has been proposed for initial mixing of flocculant chemical with the water to be treated, but improved flocculation systems of the plug flow type utilizing motive stream energy would be desirable.

Accordingly, it is an object of the present invention to provide improved systems for water flocculation treatment. It is a further object to provide such systems which utilize motive stream energy in a multi-stage flocculation treatment system having effective energy utilization. These and other objects of the invention will be apparent from the following detailed description and the accompanying drawings of which:

Figure 1:
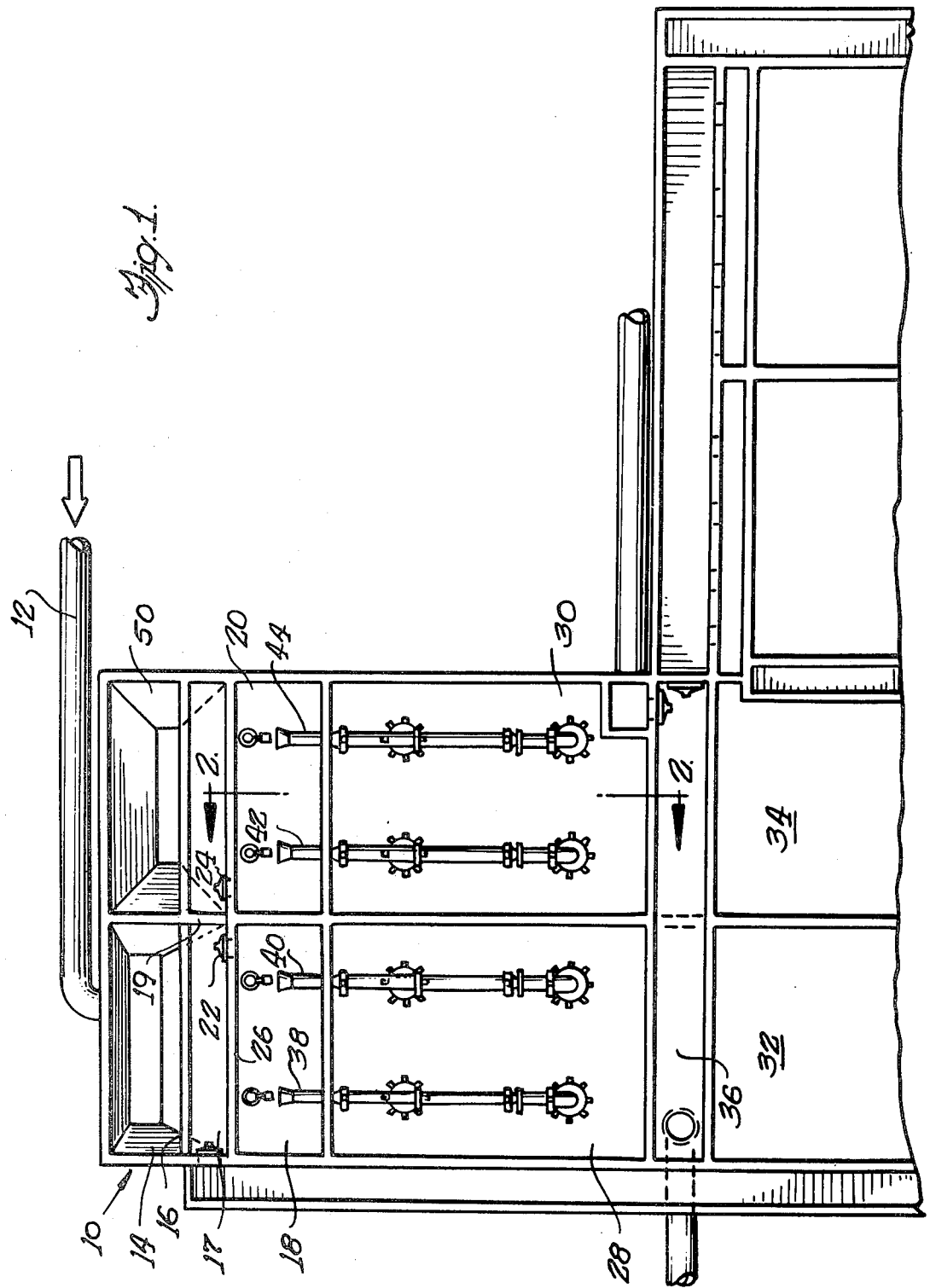
FIG. 1 is a top view of an embodiment of a water flocculation treatment system illustrating various features of the present invention.

Generally in accordance with the present invention, the flocculant chemical and the water to be treated are continuously passed through a first turbulent mixing zone where flocculant chemical concentration gradients are rapidly reduced within a limited period of time, to provide a thoroughly mixed product stream having residual hydraulic energy with respect to a flocculation zone. The raw influent water to be treated may be any type of water requiring flocculation treatment, such as partially treated wastewater (e.g., aerobic oxidation process clarifier effluent), natural lake or river water intended for potable water purposes, etc. Conventional flocculant, or coagulation, chemicals may be used, such as aluminum sulfate, ferric sulfate, ferric chloride and ferrous chloride. These flocculant materials will generally be used in the form of aqueous solutions, with the selection of the particular coagulant chemical being a matter of design choice in accordance with conventional practice. At least a minimum amount of energy, such as a specific energy requirement of at least about 0.2 horsepower per million gallons per day of treated water (hp/MGD) is expended per unit throughput of raw influent water conducted through the first mixing zone, with a turbulence intensity of at least about 50% in the mixing zone.

Further in accordance with the present invention, the thoroughly mixed product stream of influent water and flocculation chemical is introduced as a motive stream under particular conditions into a flocculation zone such that the residual energy is utilized in providing particular conditions for flocculation development. In this connection, the product stream may desirably have a hydrostatic potential in the range of from about one half to about two and one half feet of water, with respect to the water in the flocculation zone, at least a portion of which is provided by residual energy from the generation of the first stage turbulent mixing zone. The product stream may be introduced into the flocculation zone by means of one or more nozzles (or orifices) to provide in the flocculation zone particular, low degree of mixing energy for floc development, such as generally corresponding to a mean specific energy requirement of about 0.5 (ft-lb)/lb (0.09 hp/MGD) of product stream introduced into the flocculation zone at a turbulence intensity of less than about 5%.

In accordance with preferred embodiments of the method, an ejector-type mixing system is employed to produce the initial turbulent mixing zone by introducing a motive stream of a minor portion of the raw influent water to be treated, into an induction zone which is supplied with the major portion of the water liquid to be treated. The motive stream is generated by forcing the motive stream and the formation of a turbulent flow field therein. The flocculant chemical is introduced into the turbulent flow field and is best introduced into the turbulent mixing zone with the motive stream as it is introduced into the induction zone. In this manner, as set forth in U.S. Pat. No. 4,019,983, a plug flow mixing system may be provided having a highly efficient residence time distribution and rapid product inhomogeneity reduction capability.

As indicated, the product stream of the initial, plug flow mixing zone may be provided directly as a motive stream, under relatively low pressure conditions, for producing a desired degree of mixing in a reservoir of the product stream fluid in a flocculation zone, which is substantially less than that provided in the initial mixing zone. In this manner, by providing the appropriately coordinated combination of process steps and apparatus therefor, energy need only be introduced to the flocculation system at the initial turbulent mixing zone, and the mixing energy will be efficiently proportioned and utilized to provide a reliable and effective flocculation system.

Figure 2:
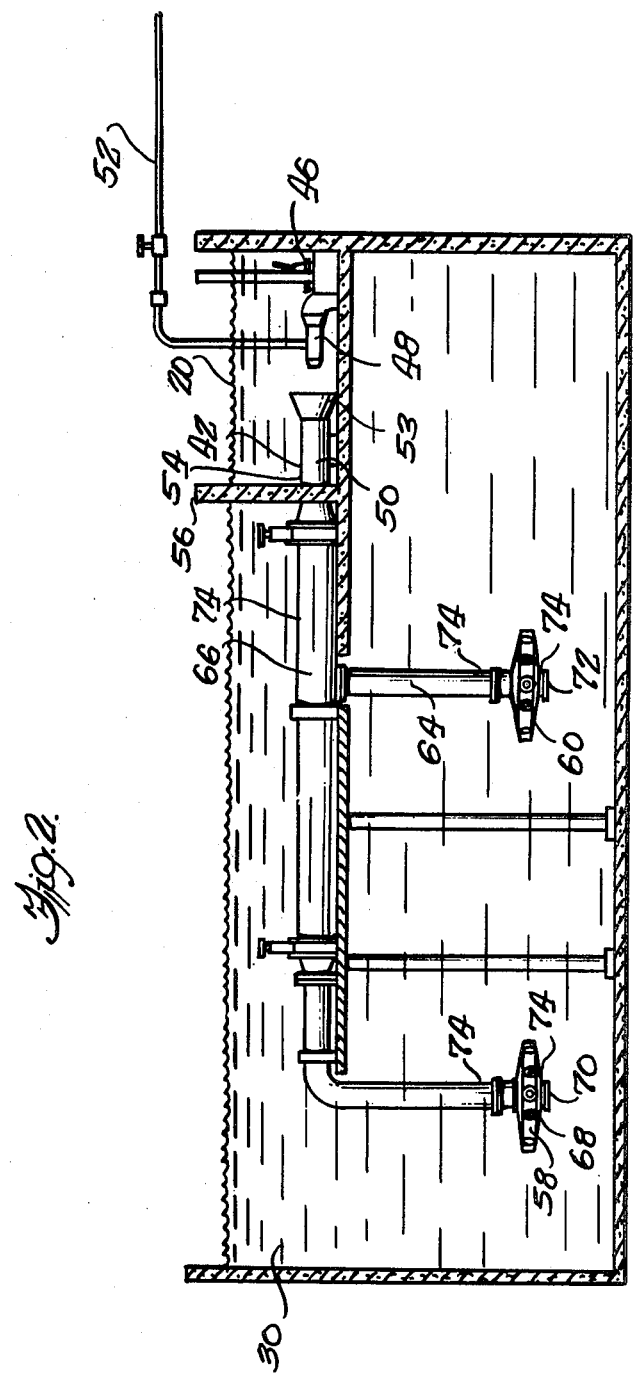
FIG. 2 is a cross sectional view of a portion of the system of FIG. 1 taken through line 2—2.

Turning now to the drawings, the present invention will now be more particularly described with respect to the specific embodiment 10 of a flocculation system of reinforced concrete construction, which is illustrated in FIGS. 1 and 2 of the drawings. The illustrated flocculation system 10 is adapted to receive wastewater effluent from the clarifier of an aeration treatment zone of a sewage treatment plant, such as an activated sludge aeration treatment facility or aerated lagoon (not shown). The partially treated effluent from the aeration clarifier will have had removed therefrom a substantial portion of the aerobic biomass and other materials by sedimentation and clarification treatment, but nevertheless will contain various suspended and colloidal materials which should be removed prior to return of the treated water to the environment. The aeration zone effluent accordingly is pumped from outfall sewer 12 into wet well 14 to provide the raw water influent to be treated by the system 10. The raw water influence flows over submerged wall 16,19 into flash mix inlet channel 17 of the system 10. In the illustrated embodiment, the flash mix inlet channel 17 communicates, respectively, with two flash mix channel sump zones 18,20 by means of sluice gates 22,24 provided in the reinforced concrete wall 26 separating the inlet channel from the respective sump zones 18,20.

The raw influent water conducted to the sump zones 18,20 is rapidly and intensively mixed with chemical flocculating agent in a manner which will be more particularly described in connection with FIG. 2 of the drawings, and the mixed product streams are introduced into respective flocculation zones, comprising tanks 28,30. A flocculated stream having a suitably developed floc is conducted from respective flocculation tanks 28,30 to algae clarifiers 32,34. From the algae clarifiers 32,34, the effluent may be conducted to appropriate filter zones, and disinfection systems such as those described in U.S. Pat. No. 4,019,983 entitled "Disinfection System and Method", which is incorporated by reference herein. The clarified and disinfected effluent may be returned to the environment following such disinfection in accordance with conventional practice.

As shown in more detail in FIG. 2, the raw influent water undergoes mixing and flocculation treatment in the treatment stages of the system 10, from the flash mix channel sump zones 18,20 to and including the flocculation tanks 28,30, by means of four substantially identical jet flash mix and flocculation assemblies 38,40,42,44. As shown in FIG. 1, each flash mix sump zone 18,20 is provided with two of the assemblies 38,40,42,44, which will now be more specifically described with respect to the assembly 42 of FIG. 2.

The assembly 42 comprises a submersible pump 46 which is adapted to receive wastewater from the flash mix sump zone 20, and to provide a pressurized output to ejector nozzle 48. The illustrated motive pump 46 is suitable for handling the type of solids encountered in a typical waste effluent and is of submersible, non-clog design with tandem, oil-filled seals. The pump is driven by a 2.5 HP, 1750 RPM motor. The pump 46 supplies influent water to the internal orifice of nozzle 48, having a diameter of about 1.4 inches, at a pressure of from about 20 to 22 feet of water, and is adapted to provide a motive jet stream from the orifice of ejector nozzle 48 having a velocity in the range of about 30 to 35 feet per second. The motive pump 46 is fitted with a suitable pipe connection, tee, elbows, support, and guide rail brackets, so that it may be removed, and repositioned, without dewatering the tank 20.

The illustrated ejector nozzle assembly 48 is a precision machined, compound jet nozzle, which is also utilized for the metering and introduction of coagulant chemical solution such as aluminum sulfate solutions or so-called pickle liquor, from chemical feed tank 51 (FIG. 1) via supply conduit 52, into the raw water being treated. The coagulant (i.e., alum) solution is supplied to an inner cavity of the nozzle 48 and inducted therefrom into the motive jet stream issuing from the nozzle. The liquid jet stream from an internal orifice of nozzle 48 may serve to induce a vacuum in the inner cavity of the nozzle 48 to assist the feed of liquid alum from an alum pump and metering system (not shown). An outer nozzle structure, which is coaxial with the internal orifice, structure forming the liquid jet, is supplied with the coagulant alum solution from conduit 52, as indicated, and as the primary motive raw water fluid from the pump 46 is forced through the internal orifice at substantial pressure, it forms a liquid jet which comes in contact with and educts the aqueous alum solution supplied to the outer nozzle structure of nozzle element 48. The rate of flow or induction, of the alum coagulant solution may be controlled independently of the flow rate of the primary motive raw water fluid pumped through the internal orifice, and will be relatively small in comparison with the primary motive raw water flow rate or the total treatment rate.

A motive jet stream, which includes the educted coagulant chemical solution, is ejected from the nozzle 48 toward flash mixing reactor tube 50, the longitudinal axis of which is aligned with the longitudinal axis of the nozzle 48.

The illustrated mixing reactor tube 50 is substantially rotationally symmetrical in cross section, and has a frustoconical, or funnel-shaped flange portion 53 at its end proximate the nozzle 48, an intermediate cylindrical portion 54 which projects through wall 56 separating zone 20 and zone 30, and a terminal diverging portion 58. The diameter D of the reactor tube (i.e., of the cylindrical portion 54) is substantially larger than the diameter d of the outer orifice of the nozzle 48, and the ratio of the reactor tube diameter D to the nozzle diameter d is desirably in the range of from about 6.5:1 to about 13:1 or more. The illustrated reactor tube 50 has a diameter D of about 14", which with the nozzle diameter d provide a D/d ratio of about 10.

The jet from nozzle 48 entrains raw water to form a turbulent, cone-shaped mixing field or mixing cone, expanding in the direction of travel, which is directed toward the reactor tube 50 to provide for appropriate intersection of the mixing cone with the reactor tube. The discharge end of the nozzle 48 may be spaced longitudinally from the proximate end of the reactor tube 50 a distance which is also related to the diameters of the nozzle 48 and the tube 50 and the expansion rate of the mixing cone. In this connection, the nozzle 48 may desirably be axially spaced a distance of from about 1 to about 2 times D from the proximate end of the tube 50. Similarly, the length of the reactor tube 50 may be from about 2 to about 5 or more times its diameter. The illustrated nozzle-reactor tube assembly is generally similar to JD-2 disinfection system apparatus sold by the Pentech Division of Houdaille Industries, Inc., but has a somewhat shorter nozzle adapted for use with alum solution. Further general description of the nozzle-reactor tube systems and operating parameters for such systems may be had by reference to U.S. Pat. No. 4,019,983.

Thus, in operation, a minor portion of the raw influent water to be treated is forced through the internal orifice of nozzle 48 to form a liquid jet which educts the coagulant at a predetermined, desired dosage rate. The liquid jet and inducted coagulant chemical form a motive jet stream issuing from the nozzle 48 which is directed toward the mixing reactor tube 50 at relatively high stream velocities, for example, in the range of from about 17 to about 82 feet per second or more. The nozzle 48 accordingly discharges both coagulant and motive fluid in the form of a relatively high velocity motive jet stream into the surrounding raw inlet water in zone 20, thus producing a turbulent mixing field and substantially instantaneous mixing of the coagulant with raw water.

The relatively high velocity motive jet stream produces a conically shaped, highly turbulent field or mixing cone which provides thorough mixing (i.e., rapid reduction of coagulant concentration gradients) of the motive jet stream. At its expanded end, the conical turbulent mixing zone intercepts the interior wall of flange 53 or cylinder 54 to provide a continuous turbulent fluid seal which functions to prevent water which has not passed through the turbulent mixing zone from entering the product discharge stream which is conducted through the tube 50. In the illustrated embodiment, the ratio M of the flow rate of raw water from the flash mix channel sump zone 20 which is educted into the motive jet stream issuing from the nozzle 48, to the flow rate of the motive jet stream from the nozzle 48 is about 7, and the residence time $\theta$ in the mixing cone is about a second, and the mixing rate $\tau^{-1}$ is about 7-8 sec$^{-1}$. The velocity of the thoroughly mixed product stream in the reactor tube is about 6-7 feet per second.

The coagulant chemical mixing with the raw water is thus carried out under relatively high specific energy requirements, relatively low mixing zone residence time, and relatively high turbulence intensities. Further-more, it will be appreciated that the plug flow mixing column provided in the flash mixing reactor tube 50 is provided with forward kinetic energy through the tube and a controlled hydrostatic potential (or back pressure) which is utilized for flocculation purposes as will now be more fully described.

The flash mixing reactor tube 50 extends through reinforced concrete wall 56 into the flocculation zone 30. However, the reactor mixing tube does not discharge directly into the zone 30, but rather is discharged into the zone by means of fluocculation jet cluster assemblies or modules 58,60 which utilize the hydrostatic potential of the flash mixing reactor tube 50 in the provision of a particular flocculation turbulence intensity and specific energy requirement in respect of flocculation tank 30.

In this connection, the thoroughly mixed water-chemical flocculant product discharge stream from the flash mixing tube 50 is utilized as a primary motive stream for the two illustrated flocculation jet clusters 58,60, which are of the type disclosed in U.S. Pat. No. 3,951,344 as jet aerator modules, which patent is hereby incorporated by reference. The illustrated clusters 58,60 are substantially identical, and are of the type supplied by the Pentech Division of Houdaille Industries, Inc. as model 100 JA radial jet aerators. The clusters 58,60 are supplied by respective downcomers 62, 64 from conduit 66, which in turn connects with the discharge end of the reactor tube 50 by means of knife gate valve 67. A similar valve 69 controls flow to downcomer 62 for flocculation jet cluster 58. Each of the flocculation jet cluster modules comprises a plurality of radially arranged nozzle elements 68 having inner (not shown) and outer frustoconical, axially aligned nozzle elements 68. The inner nozzle elements are supplied with fluid from an inner chamber, while the outer nozzle elements are supplied with fluid from an outer chamber. The thoroughly mixed water-flocculant product discharge stream from tube 50 having residual energy available from the pump 46 and nozzle 48, together with any energy representing hydrostatic head difference between sump zone 20 and the flocculation tank zone 30 is directed as a pressurized source to the inner chambers of the clusters 58,60 such that it is caused to discharge as motive jet streams from the inner nozzle elements of the clusters. The outer chamber zone of the clusters 58,60 surrounding the inner nozzle elements are provided with inlet openings 70,72 directed toward the bottom of the flocculation tank 30 such that the water-flocculant mixture from the tank 30 is educted into the low energy motive jet streams from the inner nozzle elements of the jet cluster modules, 58,60. The motive jet stream and educted fluid mixture is discharged from the outer nozzle elements 68 in radially symmetrical manner into the tank 30. As indicated in the drawing, the flocculation jet clusters 58,60 are positioned toward the bottom of the tank 30, and the emission of the discharge jets into the tank provides the tank with a desired low level of mixing intensity for the effective development of aggregation of flocculation material. In this connection, the clusters 58,60 and the other illustrated clusters are operated at a relatively low hydrostatic potential of less than about 3 feet of water pressure across the nozzle assembly (which will vary over a range of about 2 feet depending upon high or low flow conditions) such that the clusters provide a degree of mechanical energy input to the tanks 28,30 corresponding to an average specific energy requirement in the range of about 0.5 (ft-lb)/lb of treated water or 0.09 hp/MGD. The turbulence intensity, the ratio of specific energy dissipation rate to specific total energy dissipation rate, provided to the tanks 28,30 by the action of the clusters is less than about 5% to produce optimal flocculation conditions, and the illustrated tanks 28,30 each provide for extended residence time for floc development.

The radial clusters including clusters 58,60 provide a gently circulating three dimensional fluid motion to the flocculating fluid of tanks 28,30, which in turn provides mixing uniformity to the fluid in the tanks. The outlet from the flocculation zones is provided at the base of the tanks 28,30 for subsequent clarifying and filtering treatment, which may also be in accordance with conventional practice.

Organopolymeric, high molecular weight flocculation materials may desirably be introduced as flocculation aids, and in this connection, a plurality of taps 74 may be provided along the reactor tube 50, or downstream of the tube 50 for flocculant polymer solution introduction. Such taps may also be provided in the region of the flocculation jets 68 and/or in the region of the inlets 70,72 for educted flocculation tank fluid to the radial jet modules 58,60. Various flocculation polymers may be utilized depending upon conventional conditions of use, including anionic, nonionic and cationic organopolymeric flocculation materials. The metering dosage and point of introduction of such materials may be modified as desired in order to achieve the most effective results. However, it is generally not desirable to introduce the flocculant polymers in the vicinity of the mixing cones from the pump nozzles (e.g., nozzle 48 in tank 20) because of the intensity of mixing in the highly turbulent cones may degrade the polymers and deleteriously affect their flocculating effectiveness.

Suitable pH adjustment may be made, if appropriate, to the raw water influent in accordance with conventional practice, and in this connection the use of aluminum sulfate may not require the use of pH adjustment, but such adjustment may be more desirable in respect of iron salt flocculation use.

The illustrated system 10 of FIG. 1 is adapted to be suitable for treating a dry weather flow of up to a maximum of 8.0 MGD, with each of the four illustrated pump, nozzle and reactor tube systems being adapted to each have a maximum capacity of 2.0 MGD with a head loss through each reactor tube of about 1.0 inches of water at its maximum flow rate of 2.0 MGD. The pump-nozzle-reactor tube assemblies may be individually controlled so as to provide the treatment capacity appropriate to the ambient flow conditions, and as may be seen from the drawings, each assembly is located and supported in such a way that substantially all influent is intimately mixed with coagulant and conducted through the reactor tubes, and through the hydraulic seals of the turbulent jets from the nozzle with the reactor tube walls. The system may readily provide variable capacity; for example, by closing the knife gate valves at the downstream ends of the reactor tubes of tank 30, and turning off the pumps in tank 20, the system may be readily operated at a capacity of 4.0 MGD. The provision of a plurality of assemblies also results in economies of (reduced) scale, as will be discussed in the following mathematical description of system operation.

Equilibrium flocculated water residual turbidity may be regarded as proportional to the primary alum floc particle volume $V_o$, $V_o$ should be reduced to minimum optimum value.

Minimum optimum $V_o$ volume conditions may be considered to correspond to one primary alum floc particle per clay or other particle, or, $$\text{min opt } V_o = \phi/N_o \quad (1)$$

where, $\phi$ = average alum floc volume fraction, cm³/cm³
$N_o$ = number concentration of clay particles, cm⁻³

Product stream flocculant inhomogeneity conditions may be represented as a/A where "a" is the local concentration fluctuation from average value and "A" is the local concentration, in gm/cm³. a/A is desirably equal to or less than 0.1 Similarly, the primary alum floc particle volume batch growth in time $\tau$ (sec.) may be represented as follows:

$$V_o/(k_B\tau) = t/\tau + M\{1 - \exp[-t/\tau]\} \quad (2)$$

where $k_B$ is the Brownian aggregation rate of primary alum floc volume growth (cm³/sec), $t^{-1}$ is the mixing rate (sec⁻¹), and M is the flow ratio of secondary educted fluid to primary, motive fluid.

Studies of the relationship between the initial mixing stage phenomena and the overall flocculation process performance objective of turbidity removal have indicated a generally linear relationship between residual turbidity and the primary alum floc volume, $V_o$, and as indicated, flocculation process performance may be regarded to occur when the initial mixing process produces a homogeneous product stream containing primary alum floc volumes corresponding to one primary alum floc per clay particle present in the raw water. For M=39, a specific mixing process objective may be regarded to be, for example, $$k_B/V_o = 0.497 \text{ sec}^{-1}.$$

Product stream homogeneity and continuous flow residence time distribution (RTD) expressions for the primary alum floc volume in the initial mixing product stream may be provided for mixing for plug flow systems such as illustrated in the drawings, and for conventional continuously stirred tank reactor systems (CSTR) as follows:

cube root of the specific turbulent energy dissipation rate.

Figure 3:
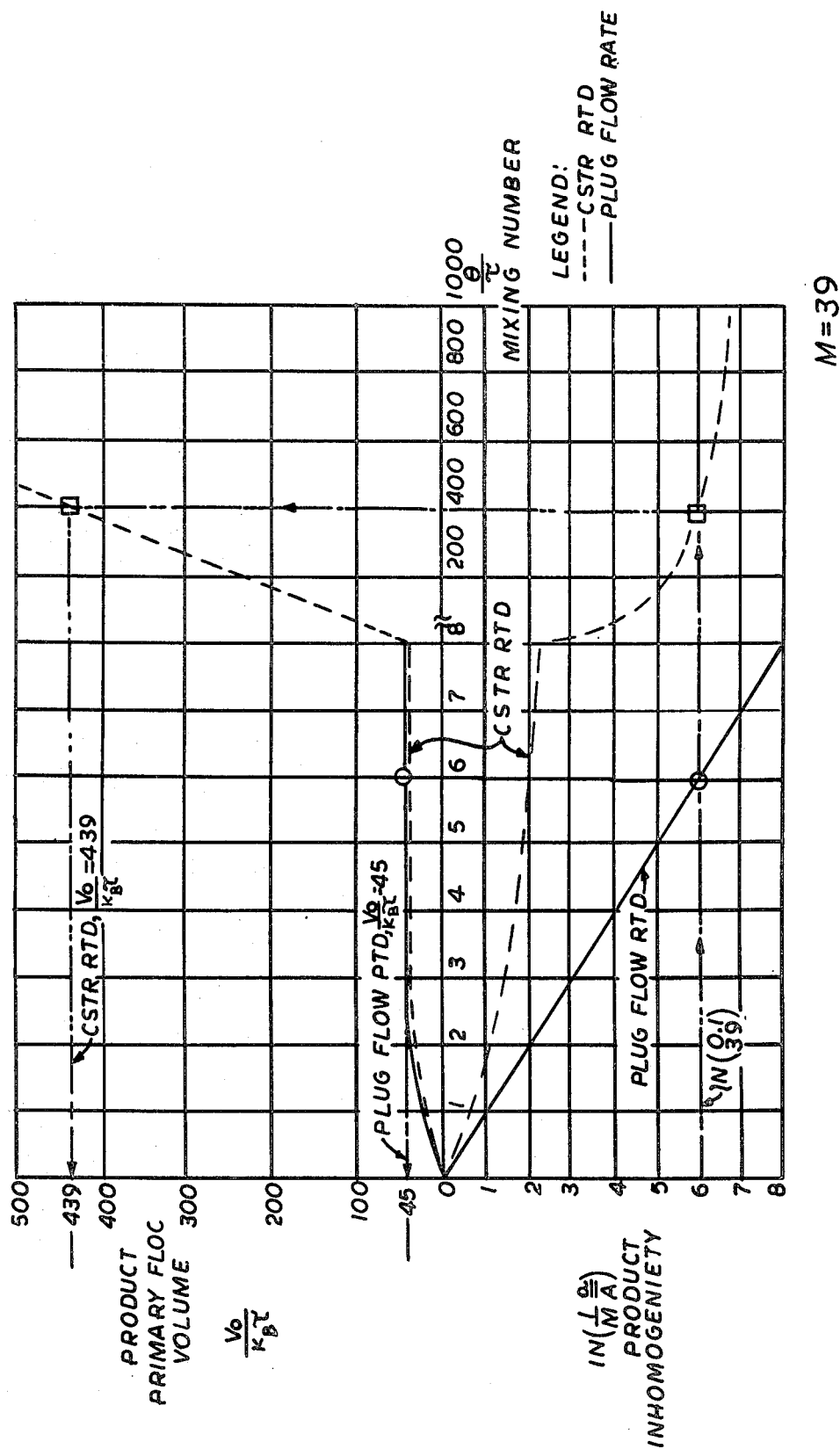
FIG. 3 is a nomograph of process parameters in connection with the apparatus of FIG. 1.

The information of FIG. 3 may be used in designing plug flow system parameters. The following examples, in addition to the larger scale system previously described, are given as examples of initial mixing stage parameters, with second flocculation stage parameters of use of the first stage product stream as second stage motive stream assumed to be similar to the larger scale system:

TABLE 3

ALUM COAGULANT INITIAL MIXING RATE MIXING EJECTOR DESIGN

| DESIRED PARAMETER | UNITS | PARAMETER VALUE MEDIUM SCALE | SMALL SCALE |
|---|---|---|---|
| M | 1 | 39 | 39 |
| a/A | 1 | 0.10 | 0.10 |
| $\theta/\tau$ | 1 | 5.96 | 5.96 |
| $\tau^{-1}$ | sec⁻¹ | 23.8 | 23.8 |
| e | (ft/sec)² | 45.7 | 0.205 |
| R | 1 | 7.25 × 10⁻⁴ | 7.25 × 10⁻⁴ |
| D | in | 3.74 | 0.25 |
| $u_1$ | ft/sec | 60.6 | 4.05 |
| $P_0-P_1$ | psig in H₂O | 24.7 | 1.50 |
| $d = DR^{\frac{1}{2}}$ | in | 0.101 | 0.0007 | where $\theta$ is the residence time, e is the specific energy required for mixing, R is the area ratio of the primary jet to the mixing parallel (reactor tube), D is the diameter of the mixing parallel (reactor tube), $u_1$ is the velocity of the motive jet, $P_o - P_1$ is the pressure drop across the jet nozzle, and d is the diameter of the jet nozzle.

The parameter determination is substantially the same for both the small and medium scale examples, except that for the medium scale example, an upper limit is placed on the specific energy requirement, whereas, for the small scale example an upper limit has been placed on the scale of the unit.

For a given flow ratio and product stream inhomogeneity, the area ratio R, may be determined in the design of the plug flow ejector system, and in the examples given, the jet diameter for the primary motive stream is approximately 3% of the diameter of the downstream

TABLE 2

| MIXING PROCESS PARAMETER | RESIDENCE TIME DISTRIBUTION; RESIDENCE TIME = $\Theta$ | |
|---|---|---|
| | PLUG FLOW | CSTR (Single Stage) |
| Inhomogeneity, $\frac{a}{A}$ | $\frac{a}{A} = M \exp[-\Theta/\tau]$ | $\frac{a}{A} = \frac{M}{(1 + \Theta/\tau)}$ |
| Primary Alum Floc Particle Volume, $v_o$ | $\frac{v_o}{k_B\tau} = \Theta/\tau + M\{1 - \exp[-\Theta/\tau]\}$ | $\frac{v_o}{k_B\tau} = \Theta/\tau + M\left(1 - \frac{M}{1 + \Theta/\tau}\right)$ |

The nomograph of FIG. 3 further illustrates various of these relationships, and the comparative efficiencies of plug flow systems. For example, a continuously stirred tank reactor residence time distribution may require a mixing rate approximately 10 times greater than that of a plug flow RTD. For a similar scale this would mean that the specific turbulent energy dissipation rate in a CSTR unit may have to be on the order of 1000 times that of a plug flow system since this rate is related to the reactor tube section.

While the invention has been particularly described with respect to the embodiment illustrated in FIGS. 1 and 2, it will be appreciated that various modifications, variations and adaptations may be provided based on the present disclosure. For example, although in the specific embodiment, the product stream from the initial flocculant mixing zone is supplied as the motive stream to a radial jet cluster array in a flocculation tank, other nozzle systems such as a linear array of nozzles directed into a flow-through flocculation zone to create circulatory fluid motion in a direction orthogonal to the general direction of mass transport in the zone, may be used to power the flocculation zone mixing requirements. Such variations, modifications and adaptations are intended to be within the spirit and scope of the present invention.

Various of the features of the invention are set forth in the following claims:

What is claimed is:

1. Multi-stage flocculation treatment apparatus including a first turbulent mixing zone adapted to thoroughly mix influent water to be treated with a flocculant chemical to form a mixed product stream, a second flocculation zone adapted to receive said mixed product stream in a manner to provide relatively low level mixing and to promote floc development, and partition means between said first and second zones;

said first turbulent mixing zone comprising
an induction zone adapted to contain influent water to be treated;
motive jet forming means adapted to receive a minor portion of said influent water under pressure and to discharge said water as a motive jet stream into said induction zone in a manner so as to induct a major portion of said influent water, together with said motive jet stream, into plug flow mixing means;
flocculant chemical introduction means adapted to introduce flocculant chemical into said motive stream at a point prior to, or adjacent to, its discharge from said motive jet forming means; and
plug flow mixing means adapted to receive and thoroughly mix said motive jet stream and inducted influent water to form a mixed product stream having residual energy from said motive jet stream;

said second flocculation zone comprising;
liquid retaining means adapted to retain mixed product for floc development; and
mixed product stream introduction means adapted to introduce said mixed product stream into said retaining means in a manner to utilize said residual energy to provide relatively low level mixing of mixed product within said retaining means; and said partition means being adapted to maintain influent water to be treated in said first zone in isolation from said second zone, and further being provided with liquid conduit means adapted to permit flow of said mixed product stream from said first zone into said second zone.

2. Apparatus in accordance with claim 1 wherein said mixed product stream introduction means includes a plurality of substantially horizontally directed nozzles disposed in said flocculation zone adapted to discharge mixed product into said flocculation zone.

3. Apparatus in accordance with claim 1 wherein said mixed product stream introduction means includes at least one radial jet cluster array disposed within said flocculation zone.

4. Apparatus in accordance with claim 3 wherein said radial jet cluster array comprises a plurality of radially arranged nozzle units having radially spaced inner and outer frustoconical, axially aligned nozzle elements, adapted such that the space between said inner and outer nozzle elements is in fluid communication with said second flocculation zone liquid retaining means, and mixed product stream discharged from said inner nozzle elements educts retained mixed product from said liquid retaining means and is discharged into said liquid retaining means through said outer nozzle elements.

* * * * *